US00RE35172E

United States Patent [19]

Clark

[11] E Patent Number: Re. 35,172

[45] Reissued Date of Patent: Mar. 12, 1996

[54] PULSED PISTON-COMPRESSOR JET ENGINE

[76] Inventor: Barre A. M. Clark, P.O. Box 5008, Mammoth Lakes, Calif. 93546

[21] Appl. No.: 375,381

[22] Filed: Jan. 17, 1995

Related U.S. Patent Documents

Reissue of:

[64] Patent No.: 5,361,581
Issued: Nov. 8, 1994
Appl. No.: 051,026
Filed: Apr. 21, 1993

[51] Int. Cl.[6] ..... F02K 5/02

[52] U.S. Cl. ..... 60/247

[58] Field of Search ..... 60/247, 269, 729, 60/271

[56] References Cited

U.S. PATENT DOCUMENTS

| | | | |
|---|---|---|---|
| 672,287 | 4/1901 | Pinkert | 60/247 |
| 1,035,454 | 8/1912 | Lewis | 60/247 |
| 2,512,254 | 6/1950 | Mallory | 60/247 |
| 2,546,965 | 4/1951 | Bodine, Jr. | 60/247 |
| 2,587,073 | 2/1952 | Swartz | 60/247 |
| 3,163,001 | 12/1964 | Reilly | 60/247 |

FOREIGN PATENT DOCUMENTS

| | | | |
|---|---|---|---|
| 390256 | 7/1908 | France | 60/247 |
| 1027474 | 5/1953 | France | 60/247 |

*Primary Examiner*—Timothy S. Thorpe
*Attorney, Agent, or Firm*—Bradley P. Heisler

[57] ABSTRACT

An air-breathing pulsed jet engine for aircraft propulsion which employs a piston compressor rather than much more expensive axial or centrifugal compressors and turbines employed by conventional turbojet engines. The engine is similar to the common two-cycle gasoline engine, except its cylinder head comprises a jet nozzle with an internal pressure-activated nozzle-blocking valve. A spring keeps this valve closed during the engine's compression stroke when the piston, connected to a crankshaft and flywheels by a connecting rod, is forced by the moment-of-inertia of the flywheels toward the cylinder head. When ignition and combustion of the compressed air and fuel occurs slightly before the piston reaches the top of its stroke, the much greater pressures within the engine's combustion chamber force the valve to pivot open. This allows a jet of combustion gases to be released through the jet nozzle into the atmosphere. The reactive forces of the gas jet work against the piston to produce linear thrust (due to the moment-of-inertia of the flywheels) and to store up energy in the flywheels to motivate the piston through the next compression stroke. The jet pulse continues until the pressure inside the combustion chamber drops to a predetermined level, when the spring is able to close the valve. Since the pressure inside the combustion chamber of a gasoline engine are on the order of those inside many rocket motors, the thrusts imparted to the engine during each jet pulse is substantial.

1 Claim, 7 Drawing Sheets

PULSED PISTON-COMPRESSOR JET ENGINE

Matter enclosed in heavy brackets [ ] appears in the original patent but forms no part of this reissue specification; matter printed in italics indicates the additions made by reissue.

BACKGROUND-FIELD OF INVENTION

This invention relates to air-breathing jet-propulsion engines which use a compressor to compress incoming air or air/fuel vapors before a combustion whose gases are expelled from a jet nozzle to produce reactive thrust for aeropropulsion.

BACKGROUND-DESCRIPTION OF PRIOR ART

Practical jet engines up to this time have been turbojet engines which utilize either centrifugal or axial compressors. These engines compress atmospheric air before a combustion, and then turbines are turned by the released combustion gases to drive the compressor. The idea of using a piston-type compressor to supply high-pressure air or fuel/air vapors for jet propulsion has been thought of since at least 1912.

In 1901 Pinkert patented (U.S. Pat. No. 672,287) an engine for propelling watercraft. It exploded solid charges in a cylinder whose underwater outlet was pointed aft of the vessel. A smaller cylinder was set at the enclosed end of the main cylinder and contained a piston. This piston's sole purpose was to drive a crankshaft after an explosion to operate a mechanism for injecting successive explosive charges into the larger cylinder. The principle of the invention was that the exploding gases would work against the water partly intruding into the main cylinder to propel the vessel forward.

In 1912 Lewis patented (U.S. Pat. No. 1,035,454) an internal combustion power apparatus for powering watercraft, aircraft, or turbines. This two-cycle engine utilized two pistons fixed on a single cylindrical shaft which reciprocated in two adjacent cylinders. One of these cylinders served as a combustion chamber and the other as an intake and holding chamber for air/fuel vapors. The shaft extended through the combustion chamber and through a circular opening leading to a conical jet nozzle and continued through the circular throat of the nozzle into the nozzle itself. Expanded-diameter lengths of the shaft acted as valves, plugging and unplugging passages for fuel vapors and exhaust gases, including the throat of the jet nozzle. This resulted in a pulse of combustion gases being expelled from the jet nozzle each cycle of the reciprocating pistons. In 1952 Swartz patented (U.S. Pat. No. 2,587,073) a compound reciprocating-pulse jet aircraft power plant which utilized combustion gases ignited in a cylinder between a piston and unique cylinder head. This cylinder head consisted of two symmetric and interlocking clamshell-shaped valves which kept the end of the cylinder closed as the piston compressed air/fuel vapors. Upon ignition of the compressed vapors the valves would open, [allow] *allowing* combustion gases to be released into a "combustion chamber." At the same time the backsides of the valves would close off ports which supplyed fresh air to this combustion chamber. Fuel would then be added to the mix of other gases in the combustion chamber, an ignition would occur, and the resulting gases would exit through the chamber's only remaining opening to the atmosphere, a jet nozzle. Jet pulses were to occur for every other cycle of the reciprocating piston.

In 1964 Reilly patented (U.S. Pat. No. 3,163,001) a reciprocating piston pulse jet engine. This engine employed a reciprocating piston in a cylinder and a cylinder head which had an aperture opening into a jet nozzle. The piston had a protruding plug in the center of its face. The piston was allowed to make contact with the cylinder head at one end of its stroke when the plug then sealed off the aperture to the nozzle. An annular volume between the piston face and the cylinder head was created at this time because of the presence of an annular indentation formed on the piston face. Compressed air/fuel vapors injected into this volume from a delay chamber were then ignited. The resulting high-pressure combustion gases then pushed the piston down the cylinder. This opened the nozzle aperture and the gases escaped out the jet nozzle to produce thrust.

Each of the foregoing inventions have limitations which probably prevented them from becoming useful and practical engines for aircraft propulsion. For effective jet propulsion it is essential that high-pressure gases be transformed into a stream of high-speed, and therefore high-momentum, gases. An equivalent momentum is then imparted to the engine in the opposite direction, according to Newton's third law of motion. To transform pressure into velocity a combustion chamber must open to the atmosphere via a constricted opening. Where combustion chamber pressures are much greater than twice that of the atmosphere the standardly-used De Laval nozzle is employed. In a De Laval nozzle the combustion chamber converges towards a constricted opening called a throat. This throat then opens to the atmosphere via a diverging-volume outlet. Gases emerging from such a nozzle are at supersonic speeds.

Pinkert's engine was not designed for aircraft propulsion and thus does not have a combustion chamber that converges towards its outlet. Its use of solid fuel would probably result in high fuel costs and a bulky feed mechanism. Lewis' design has several characteristics which would limit its performance. First, there is a relatively narrow cylindrical passageway in the nipple leading to the nozzle throat due to the presence of the rod. This would produce a resistance to the combustion gases flowing toward the throat, resisting their acceleration while causing a detrimental pressure decrease. Also, because the output of the nipple opens to an air space between the nipple and suction tube the pressure of the gases there would be detrimentally decreased further. In addition, because the flow of gases into and out of a throat should be smooth for non-turbulent flow the thrust would be diminished further by the way the stem broadens in the nozzle and by its abrupt flat end, both of which would cause turbulence. And finally, it appears from Lewis' drawings that the compression ratio of the engine is only about two-to-one, compared to the optimum of about eight-to-one for standard gasoline piston engines.

The cylinder and piston in Swartz's engine seem to have two purposes. The first is to open the clamshell-shaped valves to close off the incoming-air port of the combustion chamber, in a way similar to that of the inlet shutter valves of the pulse jet of the German V-1 flying bomb. The second purpose is to provide combusters gases to the combustion chamber- The valves, therefore, are only designed for allowing and blocking the sage of gases out of the cylinder as well as blocking the fresh-air ports. These valves can not act as jet nozzles producing a high speed gas jet because of their interproducing teeth and sharp internal corners, both of which would create turbulence, and therefore low speed gas flow. Also, the wide angle made by the diverging inner surfaces when the valves are open is much greater than that of an effective diverging section of a jet [noble] *nozzle* which is between approximately 20 and 50 degrees. Since these valves pass exhaust molecules into the combustion chamber, it seems like the ensuing combustion would be hindered rather than helped, as claimed. Also, there is no compression in the combustion chamber besides that caused by ram air. And since the combustion chamber is not shaped to turn velocity into pressure, like a ram jet's internal chamber, the compression from ramming would be small. Therefore the resulting combustion pressure and resulting thrust would be relatively small. In addition Swartz's engine is a four-cycle design, which produces half as many pulses, and therefore half the average thrust, of an otherwisely similar two-cycle engine.

Reilly's engine is very complicated, having a high parts count which includes four valves. This would have a detrimental effect on the engine's reliability and cost. The design would produce relatively low thrust because the compression ratio is apparentely only about two-to-one to three-to-one. This is apparent from the relative sizes of the cylinder and delay chamber as shown m the drawings. Also, the release of vapors from the delay chamber to the firing chamber will reduce pressures in both to an equal and Dower pressure. In addition, a large proportion of the vapors will remain in the delay chamber for each cycle. And finally, since ignition in Reilly's engine can only occur when the piston meets the cylinder head there can be no spark advance as speed increases to compensate for the finite flame speed of the combustion., which is typically 50–100 feet/sec.

OBJECTS AND ADVANTAGES

There are numerous objects and advantages of my engine relative to the engines just discussed and conventional turbojet engines. Compared to the turbojet engine, with its hundreds of precision-formed, high-strength blades and vanes my engine is vastly simpler and will be much cheaper to manufacture. Although my engine probably could not be competitive in high-thrust applications, such as powering high performance military aircraft or large aircraft in general, in the smaller classes it could probably replace turbojets in certain applications. And because turbojet engines cannot be practically built and produce useful thrust below a certain size, and my design is similar to engines that power model aircraft, new applications for jet engines may become realizable. One such application could be the strap-on jet belt, which has only been realized using 20-second-duration rocket engines. FIGS. 16 to 20 show some potential applications of my engine, and are explained [on pages 7 and 8] *below* .

Compared to the somewhat similar patented engines just discussed my engine has numerous advantages that should make it powerful and simple enough to be practical. My engine has a single piston and single valve, and a single space between the piston and cylinder head that serves as the compression chamber, combustion chamber and part of the jet nozzle. Since my engine has a relatively high compression ratio and therefore high combustion pressures (about 1000 pounds per square inch, or psi) it employs a De Laval nozzle which has smooth and gently curving surfaces to produce supersonic gas velocities comparable to those of many rocket engines, with a corresponding thrust. Most of my engine employs the very mature technologies related to the ubiquitous two-cycle gasoline engine, which has been mass-produced for many decades. My engine uses a simple locking pin to keep the nozzle valve closed when desired to allow warming-up, idling, or checkout before flight. It can use a conventional variable-timing ignition system and a conventional carburetor. The variable ignition timing along with an adjustment to change valve-opening pressure allow for optimum performance over a wide range of power settings as well as tuning for changes in fuel type, ambient temperatures-altitude, and other variables.

Further objects and advantages of my engine will become apparent in the drawings and following description.

DRAWING FIGURES

FIG. 10 illustrates the moment during the downstroke of the piston when the induction port is uncovered and air/fuel vapors are injected into the combustion chamber (valve closed).

FIG. 11 illustrates compression of the air/fuel vapors during the piston's upstroke.

FIG. 12 shows the moment of ignition when combustion starts, the valve opens, a gas jet develops, and a new air/fuel vapor charge is inducted into the [cylinder and] crankcase.

FIG. 13 illustrates when the piston is at top-dead-center and the jet pulse and thrust are at their approximate peaks.

Figure 1:
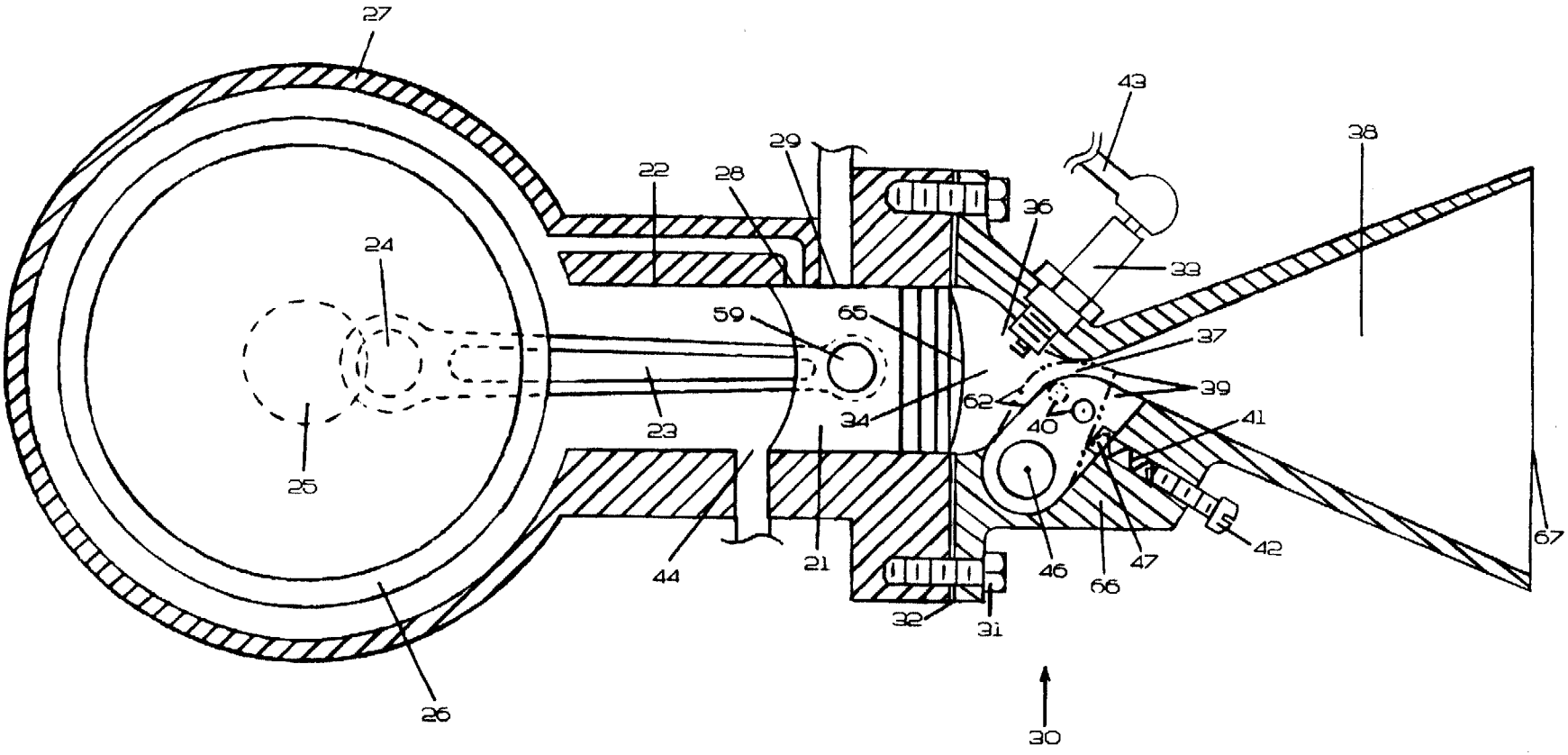
FIG. 1 is a right-side sectional elevation of the crankcase and cylinder head of my engine with non-sectional views of the installed parts.

| Reference Numerals in Drawings |
|---|
| 21 piston |

-continued

| Reference Numerals in Drawings |
|---|
| 22 cylinder |
| 23 connecting rod |
| 24 crankpin |
| 25 crankshaft |
| 26 flywheel |
| 27 crankcase |
| 28 injection port |
| 29 low-pressure exhaust port |
| 30 cylinder head |
| 31 cylinder head bolts |
| 32 head gasket |
| 33 spark plug |
| 34 combustion chamber |
| 35 not used |
| 36 nozzle converging volume |
| 37 throat |
| 38 nozzle diverging volume |
| 39 nozzle valve |
| 40 valve locking hole |
| 41 valve spring |
| 42 adjustment bolt |
| 43 high-voltage lead |
| 44 induction port |
| 45 valve locking pin |
| 46 valve axis |
| 47 spring socket |
| 48 starter/electrical ignition system |
| 49 roller bearings |
| 50 direction of rotation |
| 51 air/fuel vapors |
| 52 combustion |
| 53 not used |
| 54 gas jet |
| 55 thrust |
| 56 low-pressure exhaust |
| 57 high-pressure force |
| 58 not used |
| 59 piston pin |
| 60 crankshaft bearing holes |
| 61 crankshaft main journals |
| 62 valve face |
| 63 not used |
| 64 not used |
| 65 piston face |
| 66 jet nozzle |
| 67 nozzle outlet |
| 68 not used |
| 69 not used |
| 70 valve band |
| 71 side band |
| 72 valve flank |
| 73 nozzle flank |

DESCRIPTION-FIGS. 1 to 9

Overall

FIG. 1 gives a fight-side-elevation sectional view of my engine's crankcase 27 and cylinder head 30 with non-sectional views of the installed parts. The engine comprises the gas-tight east aluminum crankcase 27, which includes a cylinder 22 bolted to a east and machined steel cylinder head 30 which comprises a jet nozzle 66. A machined aluminum or steel piston 21 tightly fits within cylinder 22 and secures one pivoting end of a forged steel connecting rod 23 by a steel cylindrical piston pin 59. The other end of connecting rod 23 is pivotally connected to a forged steel crankshaft 25 by a steel crankpin 24. See also FIG. 2. Parallel disk-shaped flywheels 26 are rigidly and concentrically attached by their hubs to the axis of crankshaft main journals 61. Roller beatings 49 within cylindrical crankshaft bearing holes 60 bear crankshaft main journals 61. The compression ratio is about eight-to-one.

Cylinder head 30 is attached to crankcase 27 with cylinder head bolts 31, with a head gasket 32 sandwiched between the attachment surfaces of the two pans. Cylinder head 30 comprises a converging/diverging (De Laval)jet nozzle 66 whose internal surfaces are smooth and gently curving. The most constricted internal cross-section of jet nozzle 66 is an area of predetermined dimensions called a throat 37. The internal converging portion of jet nozzle 66, a nozzle converging volume 36 of predetermined dimensions, is partly defined by that part of the inner surface of jet nozzle 66 closest to piston 21. This surface and a piston face 65, along with the part of cylinder 22 between the two, also partly define a volume called a combustion chamber 34. Electrodes of a spark plug 33 screwed into cylinder head 30 project into combustion chamber A duct leads from an opening to the volume inside crankcase 27 to an air/fuel injection port 28 which is an opening to volume inside cylinder 22. A low-pressure exhaust port 29 opens to the volume inside cylinder 22 at a point closer to cylinder head 30 than injection port 28 and opens to the atmosphere via another duct. An air/fuel induction port 44 opens to cylinder 22 at a point farther from cylinder head 30 than injection port 28 and is connected to a carburetor (not shown) by a duct. Each of these ports is closed by the side of piston 21 at different stages during each cycle.

Cylinder head 30 also comprises a pressure-actuated nozzle valve 39 which opens and closes the internal volume of jet nozzle 66 near throat 37. When nozzle valve 39 is open combustion chamber 34 is exposed to a nozzle diverging volume 38 of predetermined dimensions which opens directly to the atmosphere at a nozzle outlet 67. See FIG. 3, which is a view looking into jet nozzle 66 when nozzle valve 39 is open.

Nozzle Valve and Throat Region

Refer to FIGS. 1, 3, 4, 5, and 6. Nozzle valve 39 and the inner surfaces of jet nozzle 66 near throat 37 are formed such that when nozzle valve 39 is closed it will substantially seal off jet nozzle in a volume near and including throat 37.

When nozzle valve 39 is in its open position the internal volume of jet nozzle 66 near throat 37 is unobstructed and has four sides. One side is formed by part of a valve face 62 which is flush with the internal surface of jet nozzle 66. In this open position valve face 62 extends from one side of the surface defining nozzle converging volume 36, through throat 37, and out into one side of the surface defining nozzle diverging volume 38. While in this open position the rest of nozzle valve 39 is held in a recess along the inner surface of jet nozzle 66. Nozzle valve 39 is moved to closed position (see FIG. 1) by pivoting out of the recess about a valve axis 46 set in that part of jet nozzle 66 near crankcase 27. This is accomplished by a compression-type valve spring 41 which is adjusted by an adjustment bolt 42. Valve spring 41 acts upon the backside of nozzle valve 39 at a spring socket 47 which is at a predetermined lever-ann distance from valve axis 46 to cause a closing torque. This torque causes a narrow valve band 70 across valve face 62 to meet and press against a similar narrow side band 71 across another, opposite internal side of jet nozzle 66. These two bands are of equal length and are contingent when they meet. Thus they create a substantial seal on one side of inner surface of jet nozzle 66 when nozzle valve 39 is in closed position.

Nozzle valve 39 also has two flat and parallel sides, called valve flanks 72, which are perpendicular to valve axis 46. When nozzle valve 39 is in closed position valve flanks 72 face two fiat internal surfaces, called nozzle flanks 73, which form the remaining two internal sides of jet nozzle 66. Nozzle flanks 73 are parallel and very close to corresponding valve flanks 72, whereby creating substantial seals of jet nozzle 66 along sides of nozzle valve 39. Nozzle valve 39 may be locked in the closed position by inserting a valve locking pin 45 (see FIG. 6) into a valve locking hole 40 on one side of nozzle valve 39.

Figure 7:
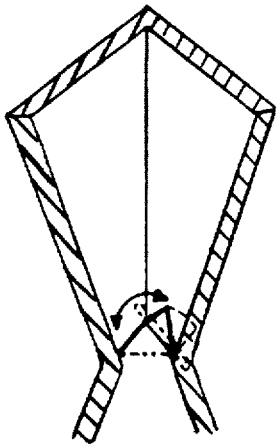
FIG. 7 illustrates an alternative design with a triangular-flap nozzle valve and a throat region with triangular sections.
Figure 8:
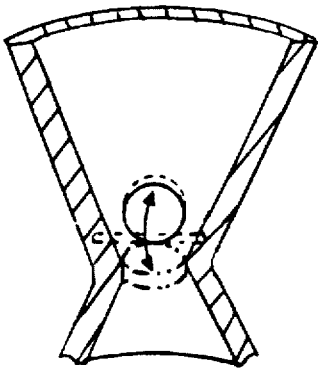
FIG. 8 illustrates an alternative design with a disk-shaped flap nozzle valve and a conical throat region.
Figure 9:
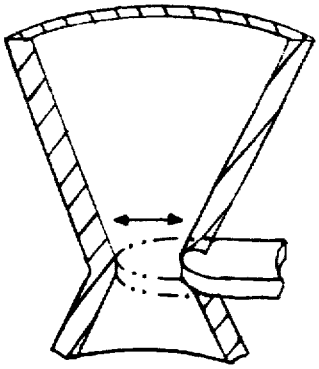
FIG. 9 illustrates an alternative design with a sliding-septum nozzle valve and a conical throat region.

FIGS. 7, 8, and 9 show other possible valve and throat designs. FIG. 7 shows a triangular throat which is closed by a triangule-shaped valve which pivots on an axis which makes up one side of the throat. FIG. 8 shows a circular throat which is closed by a circular valve which pivots on an axis which must be tangent to the throat. FIG. 9 shows a circular throat which is closed off by a laterally-moving septum whose end is semi-circularly shaded. In each of these designs the valve also emanates from the inner nozzle surface. The valves in FIGS. 7 and 8 can be made flush with the inner surface of the nozzle when in the open position. The valve in FIG. 9 will leave recesses about the throat when in its open position, causing undesirable turbulence in the gas flow. None of the seals created by these designs would be as tight over the operating temperature range as my nozzle valve 39 and throat region designs. Also, the valve opening and closing mechanisms of these designs would be much more complicated than the pressure-activated pivoting action which opens and closes my nozzle valve 39.

Accessories

Figure 2:
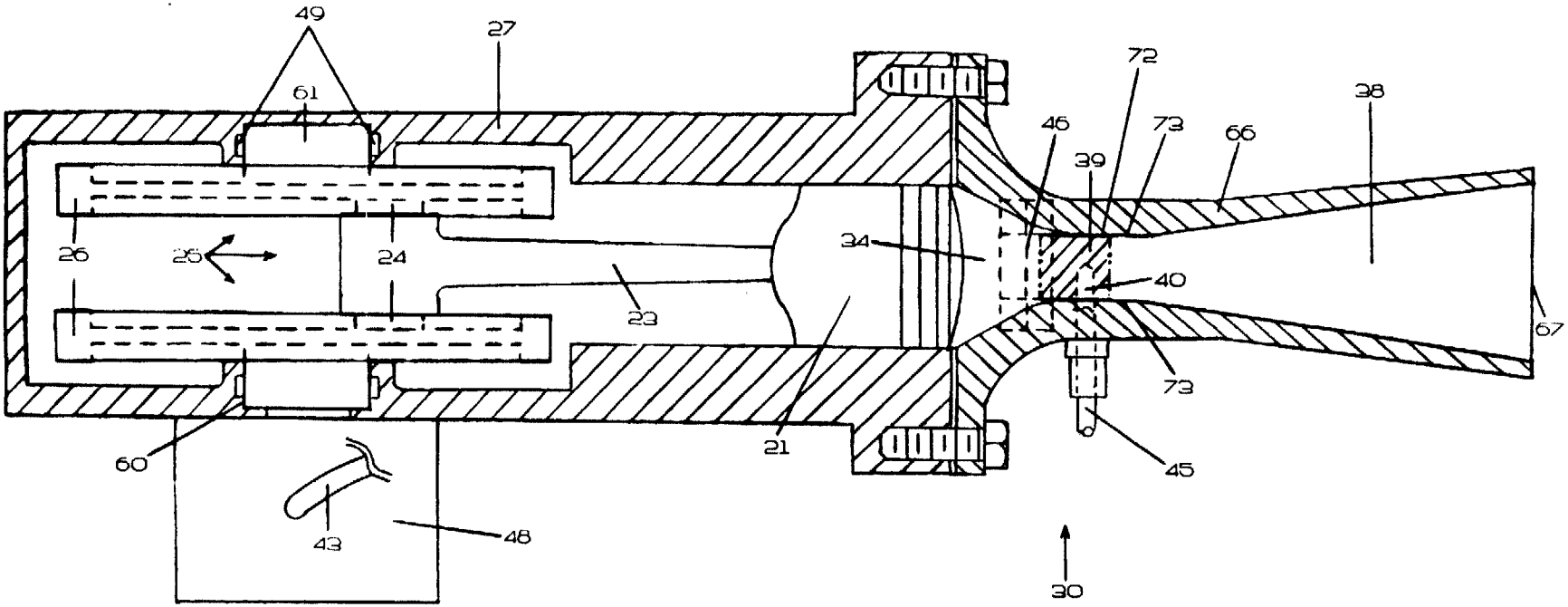
FIG. 2 is a top section of the crankcase and cylinder head with non-sectional views of the installed parts.
Figure 3:
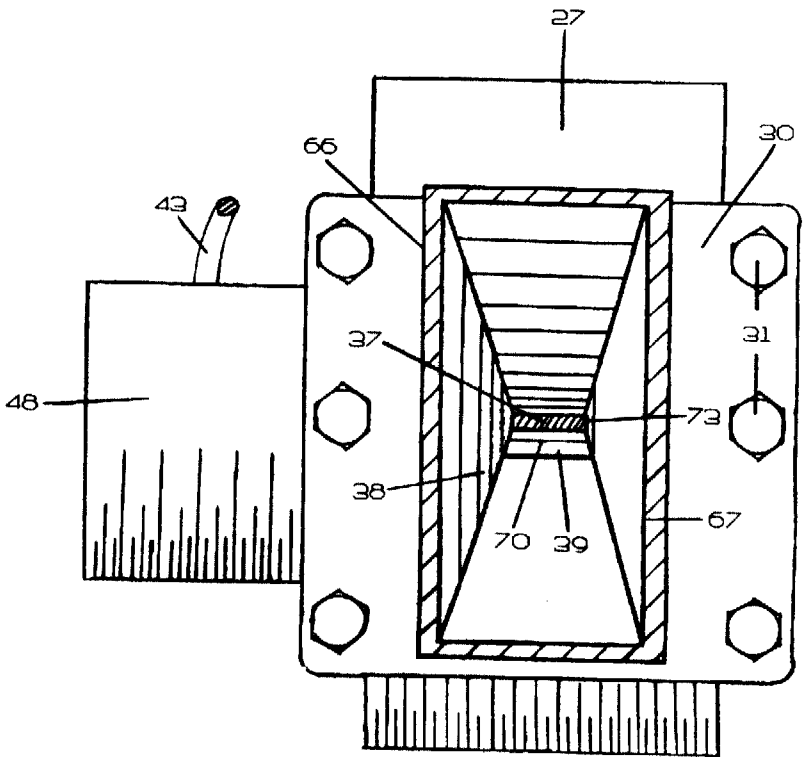
FIG. 3 is a rear elevation view looking into the jet nozzle when nozzle valve is open.
Figure 4:
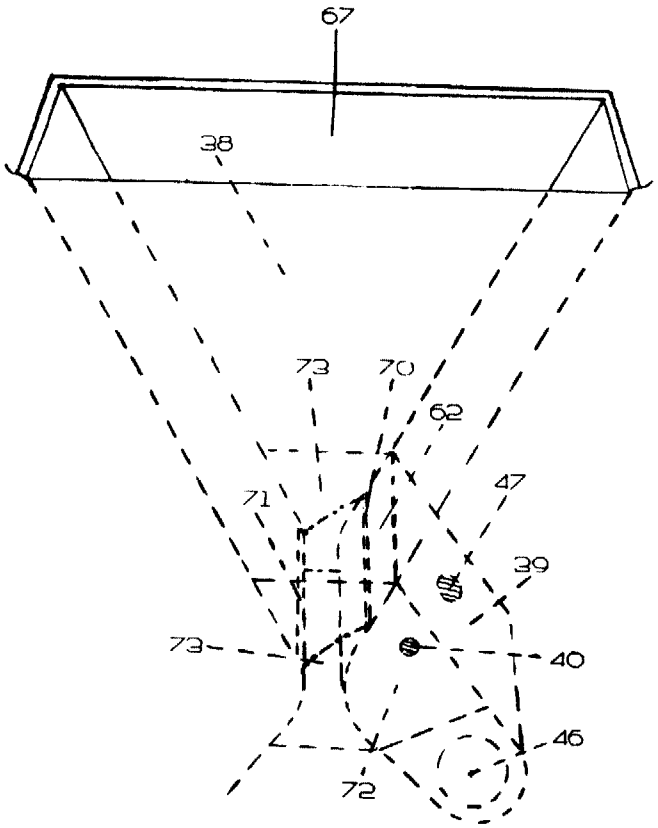
FIG. 4 is a transparent perspective view illustrating the various features of the nozzle valve and throat region.
Figure 5:
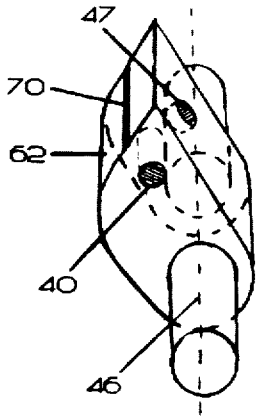
FIG. 5 is a perspective view of the nozzle valve.
Figure 6:
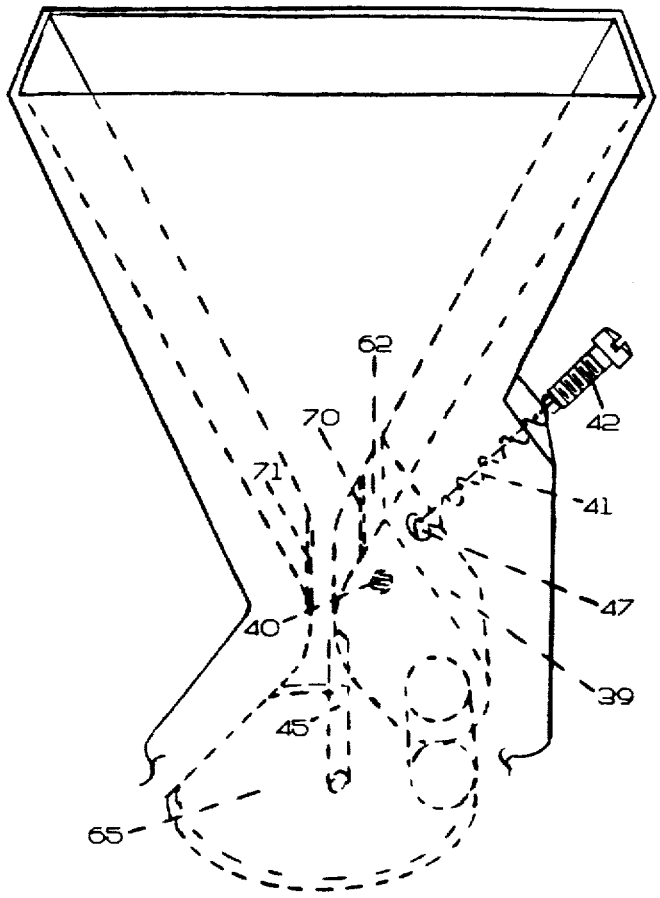
FIG. 6 is an additional transparent perspective view of the nozzle valve and jet nozzle showing valve closing and locking mechanisms.

To start my engine and provide correctly-timed high-voltage pulses for ignition a starter/electrical ignition system 48 is attached to the side of the engine (as shown in FIGS. 2 and 3) and is connected to one of crankshaft main journals 61. This assembly can comprise an electric motor (not shown), or a hand-operated mechanism (not shown) for starting smaller engines. For ignition, the system 48 can comprise a high-voltage generating device, such as a magneto (not shown), to provide voltage pulses to a high-voltage lead 43 that runs to spark plug 33. Electrical ignition system 48 automatically advances the timing of the pulses as revolution speed increases to compensate for the finite flame speed of the combustion.

Operations-FIGS. 10–15

General

My engine is an embodiment of Newton's third law of motion: to every action force there is an equal and opposite reaction force. It utilizes forces from a chemical reaction (combustion of air/fuel vapors 51) acting on the resulting molecules of the combustion to propel them away from the engine at high speeds. These forces produce an equal reaction force on surfaces in combustion chamber 34 and diverging portion of jet nozzle 66 to propel them and whatever is attached to them in the opposite direction as the exhaust molecules. Because my engine uses atmospheric air for its oxident it falls in the same class as turbojet engines, however, its combustion pressures, which can exceed 1000 psi,* and its jet velocities, which can be greater then 6000 mph, are more similar to those of rocket engines. Turbojet engines have combustion pressures around 400 psi and maximum jet velocities of about 1400 mph. Since thrust is proportional to the square of the jet velocity (i.e., Thrust ~[k]$Vel^2$, [where k is a constant)] the potential power of my engine is substantial. The engine is a two-stroke, or "two-cycle", type.

*For a compression ratio of about eight-to-one and gasoline as fuel

While a turbojet engine uses an axial or centrifugal compressor, my engine employs a piston compressor. And while turbojet engines extract energy from the combustion gases before their ejection by passing them through turbines which in turn run the compressor, my engine extracts energy from the combustion gases during their ejection also. They accelerate the angular velocity of flywheels 26 by motivating piston 21 down cylinder 22, thereby providing rotational kinetic energy to motivate same piston 21 through a successive compression stroke. However, a turbojet engine produces a continuous jet, while my engine produces a pulsating jet.

From the foregoing description of my engine, and by the following descriptions of sequential moments and events during one complete cycle of my engine (illustrated in FIGS. 10–15), its operation is easily understood.

Air/Fuel Vapor Injection

Figure 10:
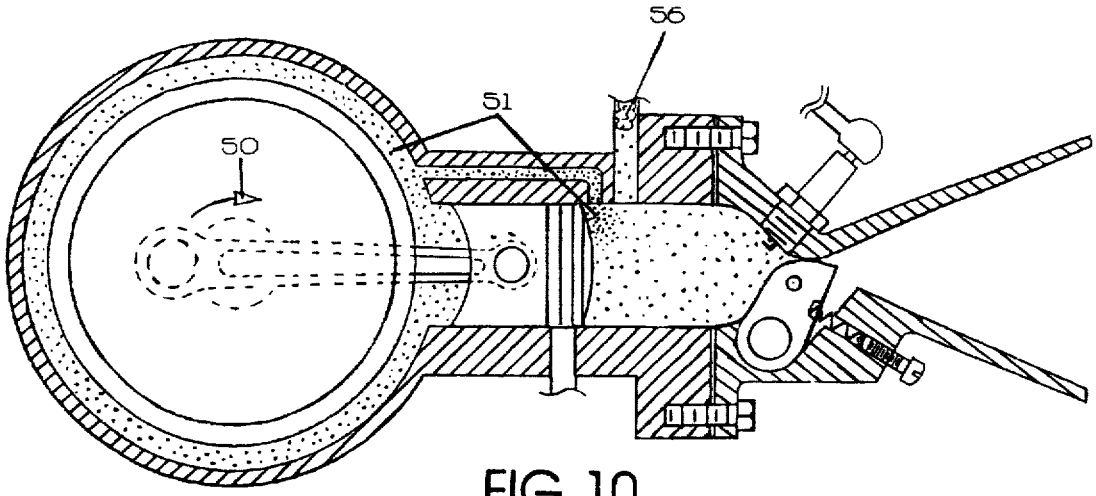
FIGS. 10–13 illustrate successive events occurring during one engine cycle.

The engine is started by starter/electrical ignition system 48 which starts reciprocation of piston 21 within cylinder 22. In FIG. 10 piston 21 is shown at the bottom of its stroke. At this position it uncovers injection port 28, allowing slightly compressed air/fuel vapors 51 to be injected into combustion chamber 34. Nozzle valve 39 is closed due to the force exerted on it by valve spring 41. Air/fuel vapors 51 expel the remaining low-pressure-exhaust 56 out low-pressure exhaust port 29. The energy stored in flywheel 26 rotating in direction of crankshaft rotation 50 moves piston 21 to the position shown in FIG. 11.

Compression

Figure 11:
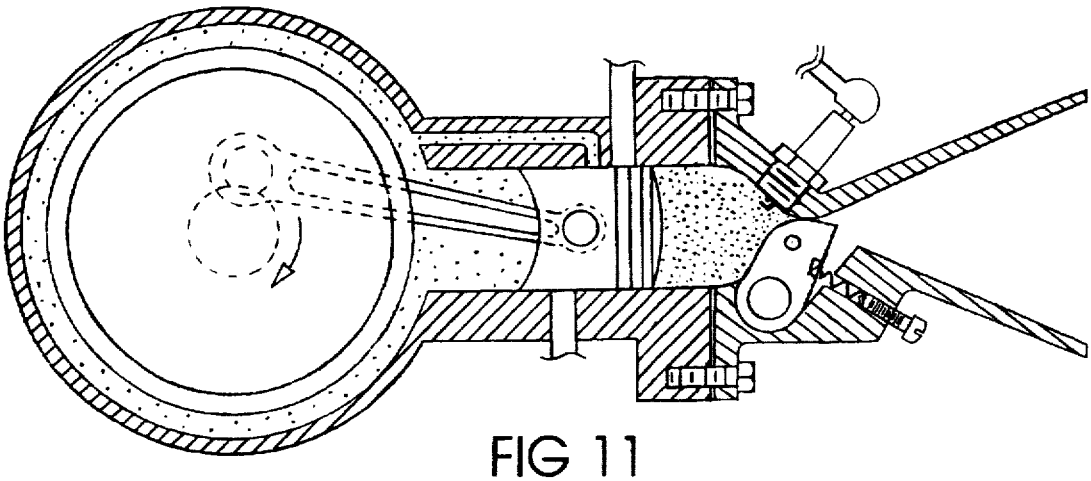

In FIG. 11 piston 21 has moved to a point where it blocks low-pressure exhaust port 29 and has started compressing air/fuel vapors 51. The force of valve spring 41 will keep nozzle valve 39 closed throughout the following compression. As stated before, the rotational kinetic energy in flywheels 26 will motivate the piston throughout the compression.

Ignition/Start of Jet Pulse

At a further stage of compression, before piston 21 reaches the top of its stroke, starter/electrical ignition system 48 provides a high voltage pulse to spark plug 33. The resulting spark initiates a combustion 52. See FIG. 12. Combustion 52 proceeds as a flame spreading away from spark plug 33 at a speed between 50 to 100 feet per second. This flame has a temperature of approximately 3500° F. and produces a pressure in combustion chamber 34 which can exceed 1000 psi.* This high pressure against valve face 62 produces an opening torque about valve axis 46 which overcomes the closing torque produced by valve spring 41, and nozzle valve 39 opens. The high-pressure combustion gases then move toward opened throat 37, reaching supersonic speeds in nozzle converging volume 36. As the gases near throat 37 they slow to approximately sonic speed. As the gases emerge into nozzle diverging volume 38 they expand and accelerate again, reaching speeds at nozzle outlet 67 which can exceed 6000 mph. If jet nozzle 66 is designed correctly the pressure of gas jet 54 at nozzle outlet 67 will not be much greater than the ambient pressure.

*With gasoline as fuel

The thrust 55 on the engine is from the forces acting on piston 21 and imparted to crankshaft 25 and crankcase 27 by connecting rod 23. The high pressure against piston face 65 causes a force vector along longitudinal axis of connecting rod 23 that acts on crankpin 24. Because combustion 52 and gas jet 54 start slightly before piston 21 is near the top of its stroke and continue until piston 21 is slightly past the top of its stroke (the area of throat determines duration of gas jet 54) the forces acting on crankcase 27 are acting in a direction approximately along the longitudinal axis of the engine. And because of the moment-of-inertia of flywheels 26, forces acting along connecting rod 23 when piston 21 is not at the top of its stroke still contribute to the engine's linear acceleration, as well as the angular acceleration of flywheels 26. The moment-of-inertia of flywheels 26 is predetermined so that just enough force on connecting rod 23 is transformed into angular acceleration of flywheels 26 required to compensate for the angular deceleration experienced during the compression stroke. This allows for steady state operation while transforming most of force along connecting rod 23 into thrust 55 on engine, Flywheels 26 are also designed to be as light as possible while having the required moment-of-inertia (e.g. by having most of their mass in outer rims).

Figure 12:
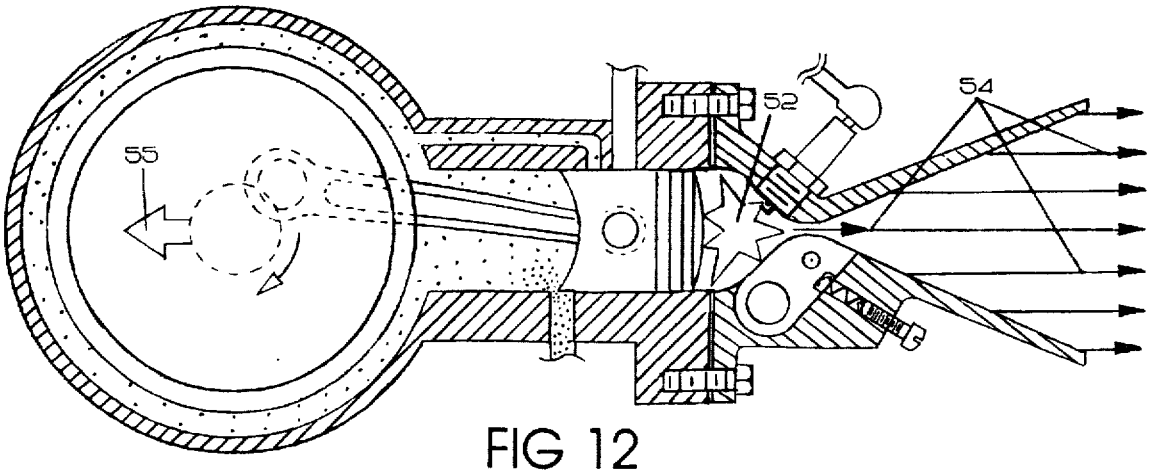

Also shown in FIG. 12 is the start of the induction of air/fuel vapors 51 coming from the carburator into crankcase 27 via induction port 44. These vapors are drawn into crankcase 27 by the slight vacuum created when piston 21 is in shown position.

Gas Jet Peak

Figure 13:
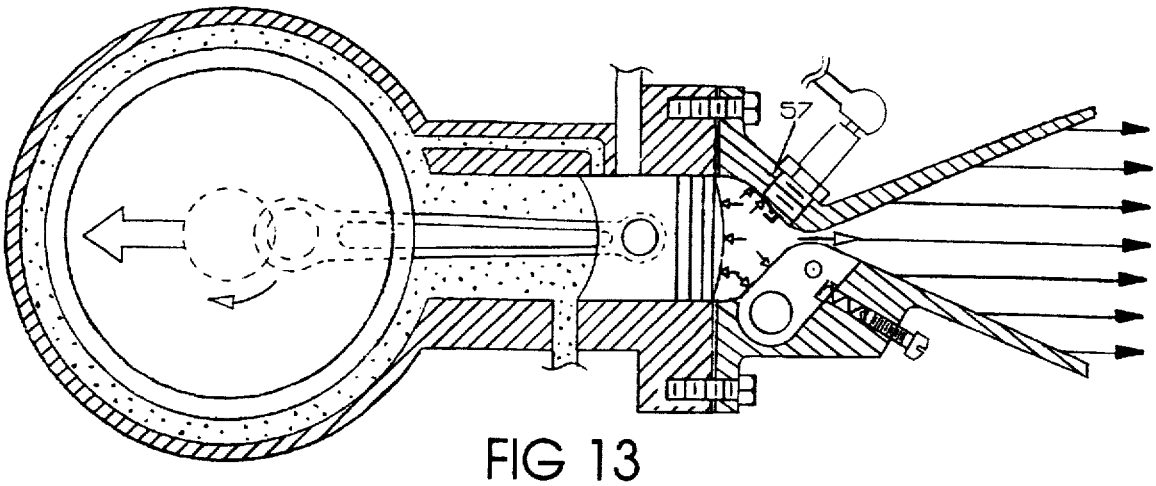

In FIG. 13 piston 21 is shown at the top of its stroke, when combustion 52 is complete. Ignition occurs before this moment because of the finite flame speed of combustion. Shown in the figure are lines of high-pressure force 57 acting on the surfaces of combustion chamber. At this moment gas jet $4 is approximately at its peak. Because of this and the fact that connecting rod 23 is lined-up directly with the axis of crankshaft 25 this is also approximately the moment of greatest thrust.

Continuation of Gas Jet/Crankcase Compression Starts

Figure 14:
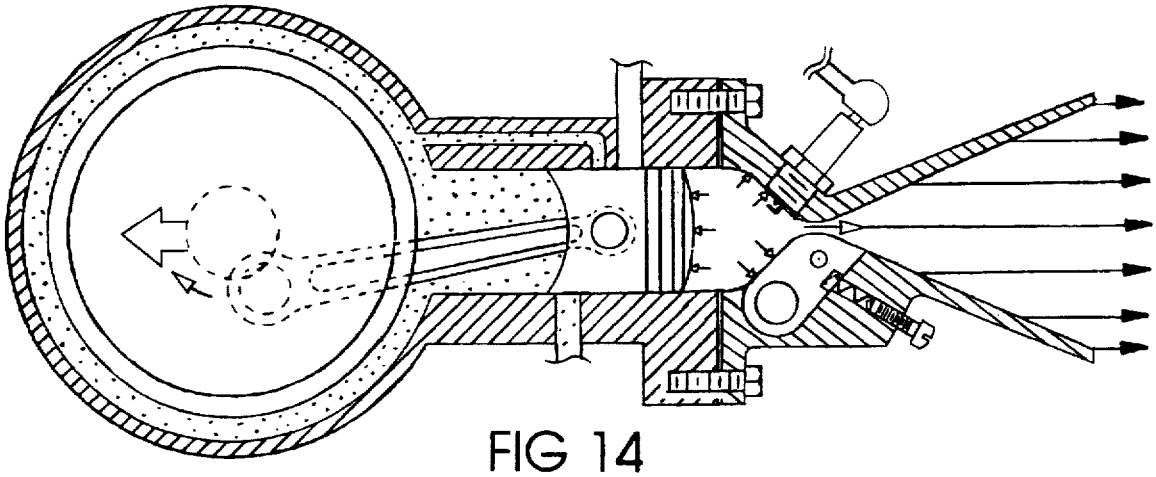
FIG. 14 illustrates the continuation of the jet pulse as the piston is on its downstroke, compressing the air/fuel vapor charge for the next cycle.

In FIG. 14 piston 21 is accelerating down cylinder 22, causing angular acceleration of flywheels 26. Since induction port 44 is blocked compression of the next charge of air/fuel vapors 51 *in the crankcase* begins. Gas jet 54 and thrust 55 are decreasing as the pressure in combustion chamber 34 decreases.

Low-Pressure Exhaust Port Uncovered/End of Gas Jet

Figure 15:
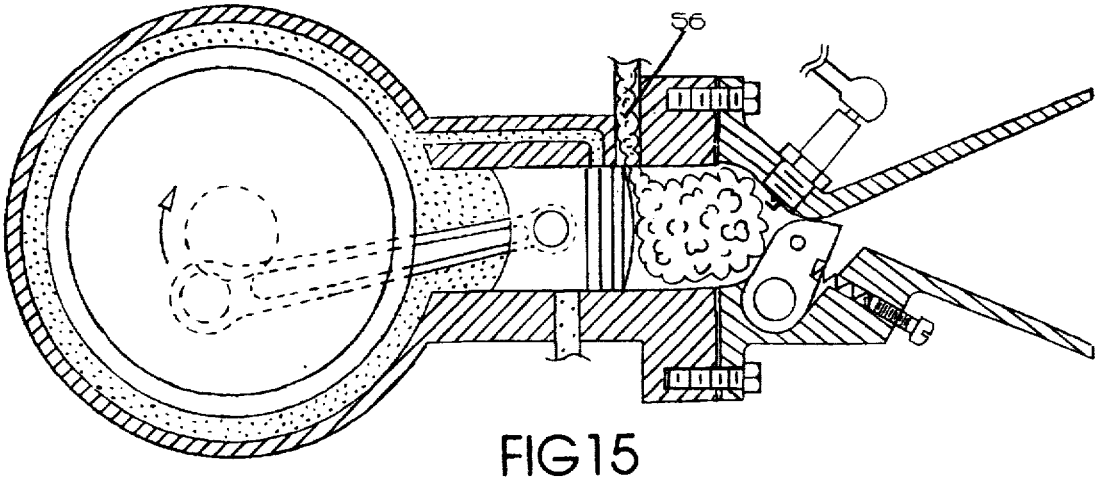
FIG. 15 shows the piston uncovering the low-pressure exhaust port, which causes the valve to close and the jet pulse to cease.
Figure 16:
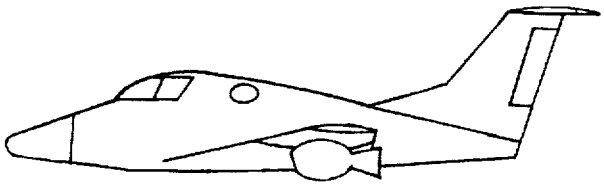
FIG. 16 shows my engine powering a four-to-six place passenger plane.
Figure 17:
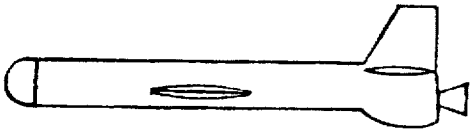
FIG. 17 shows my engine powering a military drone.
Figure 18:
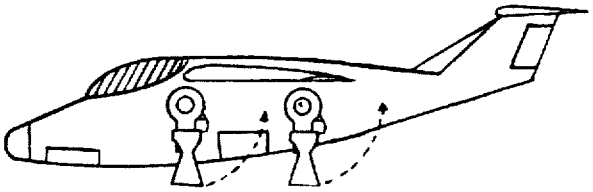
FIG. 18 shows my engine powering a vertical takeoff/landing (VTOL) aircraft.
Figure 19:
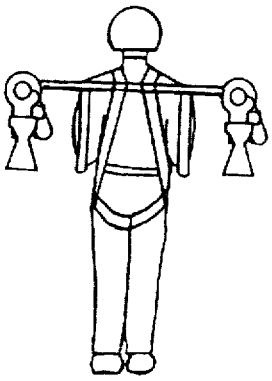
FIG. 19 shows my engine powering a personal "jet belt."
Figure 20:
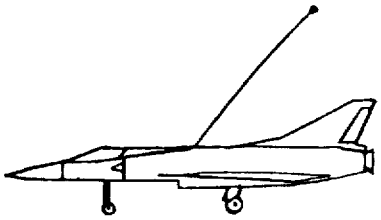
FIG. 20 shows my engine powering a radio-controlled model aircraft.

In FIG. 15 piston 21 has uncovered low-pressure exhaust port 29 which lowers pressure in combustion chamber 34 to a level that allows valve spring 41 to close nozzle valve 39. At this time gas jet 54 and thrust 55 cease. Compression of air/fuel vapors 51 continues until the next event, the uncovering of injection port 28, described earlier. Thus, each major event during the operation of this "two-cycle" engine have been discussed. Given an engine with a cylinder diameter and piston stroke approximately the same as that of a typical automobile engine, maximum revolution speeds of about 4000 RPM's can be expected. This translates into 66.7 jet pulses per second. With this high pulse rate and the mass of the engine and its host platform, a fairly level average thrust can be expected.

Nozzle Valve Locking

My engine may be operated with nozzle valve 39 locked in the closed position by inserting valve locking pin 45 into valve locking hole 40 before starting the engine. The engine may then be warmed up or idled, operating identically to a typical two-cycle internal combustion engine. When thrust is desired the engine is run up to a certain speed and valve locking pin 45 is pulled out of valve locking hole 40.

Summary, Ramifications, and Scope My engine should provide a simple, low-cost, reliable, and powerful means of jet propulsion. It will allow jet propulsion in applications where the cost of turbojet engines make their use prohibitive, or reduce the cost of certain aircraft currently powered by turbojet engines. Also, because my engine can be made smaller than the smallest effective turbojet engine and still produce proportional amounts of thrust it can be used in applications not yet realizable. See FIGS. 16–20.

While my description contains many specifics, these should not be construed as limitations on the scope of the invention, but rather as an exemplification of one preferred embodiment thereof. Many other variations are possible, including those shown in FIGS. 7, 8, and 9. Also, instead of a rectangular-shaped nozzle diverging volume 38 and nozzle outlet 67, my throat-region design can transition to a nozzle diverging volume 38 that has elliptical or circular cross sections with an elliptical or circular nozzle outlet 67. Many combustion chamber shapes are possible while still having a volume that converges towards throat 37. The throat can vary from the narrow rectangular shape shown to a broader rectangle or even a square. The bore and stroke of piston 21 may vary to give greater compression to allow use of lower-volatility fuels (such as diesel fuel) and compression ignition. Piston face 65 may have a gas-directing formation to reduce wastage of air/fuel vapors 51 which escape through low-pressure exhaust port 29. Newer technologies, such as powder metallurgy and machine ceramics, may be used to lower costs of certain parts or reduce cooling requirements for certain parts (such as nozzle valve 39). The drawings leave out any methods for cooling. Cooling of cylinder 22 and cylinder head 30 might be accomplished with air-cooling, utilizing many closely spaced metallic cooling fins. Or liquid cooling may be used, with one of crankshaft main journals 61 driving a coolant pump circulating liquid coolant around cylinder 22, cylinder head 30, and possibly into nozzle valve 39. The drawings also leave out a method of lubrication. This might be accomplished by mixing oil with the fuel, as is done with most ordinary two-cycle engines. Or a standard pumped lubrication system might be used. Instead of using a carburator, fuel-injection could be employed. And instead of the crankcase-compression method to remove exhaust and supply air or air/fuel vapors 51 to combustion chamber 34 separate blowers and compressors might be used. Several engines could share a common crankshaft to provide greater power and smoother operation (if the jet pulses from each were alternated).

Because of the very high temperatures experienced by jet nozzle 66 and nozzle valve 39 they should both be made of the same material so they have the same temperature-coefficient-of-expansion. This will result in nozzle valve 39 providing a constant seal over the experienced temperature range.

Accordingly, the scope of the invention should be determined not by the embodiments illustrated, but by the appended claims and their legal equivalents.

I claim:

1. A pulsed piston-compressor jet engine comprised a. an engine cylinder having two ends [and attached at one of said two ends to a cylinder head], b. a piston fitted inside said cylinder in a manner allowing said piston to reciprocate [towards and away from said cylinder head] *between said two ends,* c. said cylinder [head] including a jet nozzle operatively coupled thereto, said jet nozzle having an inner surface and including a nozzle outlet opening [directly] into the atmosphere, said cylinder [head] also including a pressure-actuated nozzle valve having an opened position and a closed position, and which, when in said closed position, closes said jet nozzle between said piston and said nozzle outlet in a substantially sealing manner for a compression of a supply of air, d. a combustion chamber including a space between said piston and said nozzle valve's closed position, e. said pressure-actuated nozzle valve having a valve face defining [one] *a* surface of said nozzle valve, said valve face comprising part of said inner surface of said jet nozzle when said nozzle valve is in said opened position, leaving said jet nozzle [substantially unobstructed] *without a substantially detrimental obstruction,* a portion of said valve face facing part of said combustion chamber and *at least partially* blocking [in part] said jet nozzle when said nozzle valve is in said closed position, said nozzle valve having a closing means providing closing forces to move said nozzle valve to said closed position whenever pressures from a combustion within said combustion chamber drop below a [predetermined value] *certain amount,* [said closing means also holding said nozzle valve in said closed position with a holding force adequate to keep said nozzle valve in said closed position during said compression of said supply of air,] said combustion in said combustion chamber generating pressures against said portion of said valve face facing part of said combustion chamber to produce opening forces on said nozzle valve, [said opening forces overcoming said holding force and said closing forces, allowing] *causing* said nozzle valve to retract to said opened position, whereby a gas jet is released substantially unhindered through said jet nozzle into the atmosphere due to a direct action of said combustion on said nozzle valve, f. means to provide said supply of air into said combustion chamber, g. means to provide a supply of fuel into said combustion chamber, h. means to move said piston toward said [cylinder head] *jet nozzle,* causing said compression of said supply of air within said combustion chamber when said nozzle valve is closed, i. means to cause ignition of said supply of air and said supply of fuel within said combustion chamber after said compression of said supply of air, said ignition means causing said combustion which, in turn, causes said nozzle valve to open and said piston to move away from said [cylinder head] *jet nozzle, and* j. [means to keep said nozzle valve closed during operation of engine when desired, and k.] means to impart reactive force of said gas jet to said pulsed piston-compressor jet engine, whereby a useful thrust is obtained.

* * * * *